United States Patent Office 3,207,655
Patented Sept. 21, 1965

3,207,655
DEFOAMER CONTAINING A SILICEOUS AMINO AMIDE COMPOSITION USED FOR DEFOAMING BLACK LIQUOR PRODUCED IN PULPING PROCESSES
William R. Christian, New York, N.Y., and Raymond Liebling, Springfield, N.J., assignors to Nopco Chemical Company, Newark, N.J., a corporation of New Jersey
No Drawing. Filed Feb. 13, 1963, Ser. No. 258,129
9 Claims. (Cl. 162—60)

This invention relates to anti-foaming or defoaming compositions which are particularly useful for preventing or abating foams in aqueous systems. More particularly, the present invention relates to new and novel defoaming compositions which are especially adapted to defoam concentrated or dilute black liquor produced in alkaline pulping processes.

The soda and kraft or sulfate processes are commonly referred to as alkaline pulping processes, since the chemicals used are essentially sodium hydroxide or caustic in the former and sodium sulfate or salt cake and sodium hydroxide in the latter. These processes currently represent the most utilized pulping procedures in the pulp and paper industry. One of the reasons for the continued growth of these processes is that the spent chemicals can be reclaimed and reused, thus giving an economic advantage over other methods. However, one of the greatest disadvantages of these processes is the troublesome foam which occurs during the pulp washing, screening and knotting operations.

The alkaline pulping process is performed by first cooking the wood chips in digesters and then draining off the spent chemicals for reuse. The resulting fiber or pulp is then washed free in brown stock washers of a large amount of the residual chemicals referred to as black liquor. The black liquor in these washers contains about 14% to 18% by weight of dissolved solids, has a pH of about 12 and is referred to as concentrated black liquor. Black liquor is a foamy material, its foaming increasing with an increase in the resin content of the wood used in the process. These brown stock washers are a series of vats, usually three or four in number, which alternately dilute the pulp with water and thicken it by picking it up on large rotary screens. From the brown stock washers, the pulp travels to the screen room where it is again diluted with water and put through vibrating screens which accept the now completely delignified fibers and reject the clumps of unpulped fibers, knots and other foreign material. Foam problems are severe in the screen room since the diluted pulp which contains a small amount of residual black liquor is subjected to violent agitation by the screens. The water removed from the pulp after the screening operation, usually called dilute black liquor, is normally used as the dilution water for the third or fourth stage of the brown stock washers for sake of economy. This dilute black liquor is a foamy material, containing from about 0.001% to 0.1% by weight of solids and has a pH of about 12.

Defoamers are generally used in most alkaline pulp mills during the screening operation so that more efficient screening is accomplished and to prevent the pulp thickeners, utilized after the screening operation, from becoming clogged with entrapped air. When water dispersible defoamers are used during the screening operation, a small amount is retained by the dilution water which is returned to the third and/or fourth stage of the brown stock washers. This usually prevents foam from becoming a severe problem in the washing operation. However, in mills where foam is not troublesome in the screening operation or where water insoluble defoamers such as kerosene are used in the screen room and are absorbed by the fiber rather than being emulsified into the dilute black liquor, the dilute black liquor from the screen room which is returned to the brown stock washers contains no defoamer. In these instances, foaming has been found to be a problem at the third and/or fourth stage of the brown stock washers thereby seriously interfering with the washing and thickening operations.

Heretofore, commercial defoamers containing hydrophobic silica such as those disclosed in Boylan, U.S. Patent No. 3,076,768, February 8, 1963, have proved very successful for preventing and/or abating foam in aqueous systems, particularly the foam in the concentrated and/or dilute black liquor produced in the soda and kraft or sulfate paper processes. Such defoamers, in order to provide adequate defoaming, must contain a small percentage of a spreading agent which is necessary to allow the silica to spread over the aqueous system which is to be defoamed. These spreading agents add appreciably to the cost of the process and/or product in which they are used. Furthermore these spreading agents reduce the defoaming properties of the silica defoamer due to the fact that they produce additional foam in the system which is to be defoamed. A further disadvantage of utilizing spreading agents is that these spreading agents dilute the defoamer, thus reducing the effectiveness of these silica defoamers in aqueous systems.

Accordingly, it is an object of the present invention to provide for a novel, inexpensive defoamer composition formed of relatively cheap materials whereby the need for a spreading agent is eliminated.

Another object of this invention is the provision of the process for abating or preventing foaming in aqueous systems, utilizing a new and novel defoamer whereby the need for spreading agents is eliminated.

Another object of this invention is to provide new and improved anti-foaming and/or defoaming compositions which are especially adapted to control foaming of concentrated and/or dilute black liquor in the brown stock washers used in the alkaline pulping process.

A still further object of this invention is to provide for improved anti-foaming and/or defoaming compositions which not only control foaming in the brown stock washers, but which also control foaming during the screening operation as well as in other steps or operations of an alkaline pulping process.

Other objects will become apparent from the detailed description given hereinafter. It is intended, however, that the detailed description and specific examples are not limiting, but merely indicate the preferred embodiments of this invention since various changes and modifications within the scope of the invention will become apparent to those skilled in the art.

In accordance with the present invention we have discovered that new and novel defoamers containing (1) from about 5% to 20% by weight of a hydrophobic silica containing a siliceous amino amide composition made up of from about 5% to 20% by weight of the siliceous amino amide composition, of the reaction product of a water soluble or water dispersible salt of a partial amide and a water soluble silicate salt and from about 80% to 95% by weight of the siliceous amino amide composition of uncombined or free silica, and (2) from about 80% to 95% by weight of an aliphatic, alicyclic or aromatic hydrocarbon or mixtures thereof containing at least six carbon atoms, can be utilized to prevent or abate foam in aqueous systems. These aqueous systems include concentrated and/or dilute black liquor systems which are produced during the alkaline pulping process, as well as latex systems and latex paint systems. The defoamers of this invention can be easily mixed or dispersed throughout the aqueous liquid systems to be defoamed so as to quickly and efficiently destroy the foam in the system without the need of incorporating a spreading agent therein. Hence, the new and novel defoaming compositions of this invention are highly effective defoamers without the need of utilizing spreading agents. Also the defoaming agents of this invention do not suffer from the disadvantages inherent in utilizing spreading agents. Additionally, by utilizing the defoaming agents of this invention in which a wetting or spreading agent is eliminated, the cost of the processes and/or products in which they are used is reduced.

The phenomena whereby a more efficient deforming action is produced in aqueous systems by utilizing the new and novel defoamers of this invention over the silica defoamers heretofore used is attributable to the specific siliceous amino amide composition which is dispersed in the organic hydrocarbon liquid. Additionally, by utilizing the siliceous amino amide compositions as a defoamer, there is no need to incorporate a spreading agent into the defoamer compositions so that the defoamer can spread throughout the aqueous system that is to be defoamed. The siliceous amino amide compositions which can be utilized in formulating our defoamer are well known in the art. These compositions as well as their method of preparation, are described in U.S. Patent No. 2,967,828, Ihde, Jr., January 10, 1961. The preferred siliceous amino compositions which can be utilized in formulating our defoamers and their method of preparation is disclosed in the copending application Serial No. 176,911, Ihde, Jr., et al., filed March 2, 1962.

The compound or reaction product which makes up from about 5% to 20% by weight of the siliceous amino amide composition is formed by reacting a salt of a partial amide with a water soluble silicate salt.

As used through the present specification and in the claims the expression "partial amide" means monocarboxylic acid-polyamine reaction products containing at least one amide group and at least one primary, secondary or tertiary amino group. In general, salts of such partial amides are used to produce the reaction product or compound present in the siliceous compositions. More particularly, salts of partial amides are produced by the reaction of (1) an alkylene polyamine containing two or more amino groups, such as diethylene triamine, triethylene tetramine, tetraethylene pentamine, hexaethylene heptamine, etc., and derivatives of said polyamines having alkyl, hydroxy, alkoxy, etc. groups substituted for a hydrogen of an amino group thereof, such as 3-dimethyl amino propylamine with (2) a compound selected from the group consisting of aliphatic monocarboxylic acylating substances having a carbon chain length of from about 6 to about 22 carbon atoms, naphthenic acid and tall oil. As used in the specification and in the claims, the expression aliphatic monocarboxylic acylating substances includes aliphatic monocarboxylic acids, whether saturated or unsaturated, hydroxylated or halogenated having a carbon chain length of from about 6 to about 22 carbon atoms and esters and acyl halides of such aliphatic monocarboxylic acids. For example, salts produced from partial amides prepared by the reaction of an alkylene polyamine, or a substituted alkylene polyamine, with an aliphatic monocarboxylic acid, such as caproic acid, caprylic acid, capric acid, lauric acid, myristic acid, palmitic acid, stearic acid, oleic acid, linoleic acid, linolenic acid, dichlorostearic acid or hydroxy stearic acid can be employed. Moreover, salts produced from partial amides prepared by reacting an alkylene polyamine, or a substituted derivative thereof, with a glyceride, such as tallow, soybean oil, coconut oil, cottonseed oil, palm kernel oil, castor oil and other fats and oils, either natural or with the fatty acids, or natural mixtures thereof, obtained from such glycerides, are fully suited for use. Salts produced from partial amides prepared by reacting an alkylene polyamine, or a substituted derivative thereof, with an acyl halide, such as, n-caproyl chloride, octan- oyl chloride, lauroyl chloride, stearyl chloride, etc. also can be used in producing the novel products of the invention. Also, if desired, salts produced from partial amides prepared by reacting an alkylene polyamide, or a substituted derivative thereof, with naphthenic acid, tall oil, etc., can be employed. In the preferred embodiment of the invention, however, salts produced from partial amides prepared by reacting an alkylene polyamine with an aliphatic monocarboxylic acid having a carbon chain length of from about 8 to about 18 carbon atoms are employed.

The partial amide reactant is used in the practice of this invention in the form of any one of its water-soluble or water-dispersible salts. Thus, for example, organic and inorganic acid salts such as acetic acid salts, propionic acid salts, hydrochloric acid salts, phosphoric acid salts, sulfuric acid salts, etc., of the partial amides can be employed. In addition, water-soluble or water-dispersible salts of suitable partial amides produced from organic and inorganic acids other than those specifically mentioned heretofore can be used. The acid that is used should preferably be one which will produce a water-soluble or water-dispersible salt of the partial amide.

The silicate salt employed in forming this reaction product can be in any of the various forms of sodium silicate, potassium silicate or ammonium silicate. The silicate salt should preferably be water-soluble or substantially water-soluble. Thus, if desired, sodium metasilicate ($Na_2O:SiO_2$), sodium silicate, such as, sodium silicate having the composition $Na_2O:4SiO_2$ can be used. Potassium silicate ($K_2O:SiO_2$), potassium tetrasilicate $$(K_2O:4SiO_2.H_2O)$$

or any other water-soluble potassium silicate can also be employed. Moreover, any water-soluble ammonium silicate can be employed in producing the novel reaction product utilized in the defoamer of this invention. The preferred reaction products, however, are produced by reacting the partial amide salt with sodium silicate having the composition $Na_2O:3·22SiO_2$.

The precise nature of the reaction of the silicate salt and the salt of the partial amide is not known. It is believed that the sodium, potassium or ammonium ions of the silicate form a salt with the acid radicals of the partial amide salt and that the silicate portion of the silicate salt combines with the amino nitrogen atoms of the partial amide reactant to produce the siliceous amino reaction product. However, since the nature of the reaction is not known the above theory should not be construed as limiting the scope of the invention.

In producing the siliceous composition, the silicate salt is employed in quantities which are at least stoichiometrically equivalent to the quantity of partial amide salt with which it is to be reacted. For the purposes of this invention, a "stoichiometrically equivalent" quantity is that quantity of silicate salt which will provide sufficient sodium, potassium or ammonium ions to neutralize all of the acid radicals of the partial amide salt.

The free uncombined silica which forms from about 80% to 95% by weight of the siliceous amino amide composition can be formed by reacting any silicate salt including those disclosed hereinbefore with an organic or inorganic acid to form a hydrated silica. The uncombined silica can be preferably formed before, during or after the formation of the compound by converting with acid the excess over stoichiometric amounts of the silicate salt which is employed in forming the compound. When in practice, excess silicate salt is employed, the silica which is produced when the reaction mixture is treated with acid becomes suspended in the reaction mixture. The compound resulting from the reaction of the silicate salt and the partial amide salt becomes adsorbed on the surface of the silica. When, in an alternative embodiment, the silica is prepared first it will also act as a substrate for the compound which is later formed by reacting the silicate salt with the partial amide salt.

The preferred method of preparing the siliceous amino amide compositions is described in copending application S.N. 176,911, Ihde, Jr., et al., filed March 2, 1962. These compositions are prepared by first forming the silica gel or sol. The silica sol or gel is formed in the following manner. First, a water insoluble aromatic acid such as isophthalic acid and sodium silicate are added to water, said sodium silicate being added in an amount in excess of the amount required to react with all of the acid. When this is done, a portion of the sodium silicate will react with substantially all of the aromatic acid to form the water-soluble sodium salt of the aromatic acid and a slurry containing large particles of silica. The formation of large silica particles in the substrate formed in this stage of the preparation results in the production of fine silica particles when the bulk, i.e., the remainder and any additional sodium silicate later added, of the sodium silicate is later converted to a gel or sol. Next, a solution of water-soluble magnesium salts such as magnesium sulfate is then added to the slurry. By the addition of magnesium sulfate to the slurry, the bulk of water-soluble sodium salt of the aromatic acid is converted to the water-soluble magnesium salt of the aromatic acid. A solution of sodium fluosilicate is then added to the slurry. Sulfuric acid and sodium silicate are then slowly added at the same time to the reaction slurry. The slurry is constantly agitated during the addition of these two solutions and care is taken to keep the sulfuric acid in excess at all times so that the slurry remains acid to congo red paper. Upon rendering the slurry acid, the water-soluble magnesium salt of the aromatic acid is converted to a fine voluminous precipitate of the water insoluble aromatic acid and the sodium silicate solution is converted to silica thereby forming the gel or sol.

After the gel or sol is formed, it is then allowed to digest by standing at a temperature of from about 20° C. to 40° C. for a period of from about one-half to five hours. During this digestion period the viscosity of the gel or sol increases so as to form a thickened mixture. After digestion has been carried out, the thickened silica sol or gel is heat treated at a temperature of from 40° C. to 70° C. for a period of from one-half hour to one hour during which time there is a further increase in the viscosity of the gel and sol and the formation of an acervated structure within the silica sol or gel takes place.

The partial amide salt may be prepared by dissolving the monoamide of hydrogenated tallow fatty acids and aminoethylethanolamine in an organic liquid such as Varnish Makers and Painters Naphtha or any other water insoluble organic liquid so as to form a clear solution. Glacial acetic acid may then be added to this clear solution, thus forming a clear solution of monoamide acetate.

The siliceous amino compound may be prepared by adding the partial amide salt solution and additional sodium silicate to the silica sol or gel. Upon this addition, the water insoluble aromatic acid which is present in the gel or sol is converted to its water-insoluble sodium salt and the siliceous amino compound is formed at the same time. During this addition, the silica sol or gel is agitated and care is taken to keep the partial amide salt solution in excess at all times to minimize the heavy gel formation.

The resulting slurry of the siliceous amino compound may then be digested by allowing it to stand at room temperature. Sulfuric acid may be added to the slurry and a sample of the slurry may be taken and filtered and sulfuric acid may be then added to the filtrate in order to determine whether substantially all of the water soluble aromatic acid salt has been converted to the water insoluble aromatic acid. If conversion is not complete, then sulfuric acid is again added to the reaction slurry until conversion is complete.

The slurry of the siliceous amino compound is then filtered, washed, dried and ground.

The powdered precipitated siliceous amino amide compositions which are produced by any of the methods outlined above generally have average aggregate particle diameters of from about 0.1 to 50 microns and surface areas in the range of 50 to 420 square meters per gram. If desired, jet milling or any means of grinding may be utilized to reduce the average aggregate particle diameter.

The precipitated siliceous amino compositions, which are utilized in the defoamers of this invention, are relatively hydrophilic. Hence these compositions should in most cases be treated in some manner to render them relatively hydrophobic so that they may be utilized in aqueous systems. Any suitable method may be employed for treating the normally hydrophilic siliceous composition to render it hydrophobic. One method which has proved very satisfactory is to permanently affix a liquid hydrophobic polysiloxane oil onto the particles of the precipitated siliceous amino amide compositions. Any suitable method may be employed for permanently affixing the polysiloxane oil onto the particles of the powdered siliceous amino amide composition. One method which has proved very satisfactory involves spraying the particles of the siliceous amino amide composition with a polysiloxane oil and then heating the sprayed particles to a temperature of above about 150° C. Other methods which may be utilized, include mixing the polysiloxane oil and the particles of the siliceous composition under rapid agitation or ultrasonic vibration and then heating to the aforementioned temperature. This heating step permanently affixes the hydrophobic polysiloxane oil onto the particles of the siliceous amino amide composition. The heating step should be carried out for a period of at least twenty minutes at temperatures of above 150° C. If heating is not carried out, the polysiloxane oil can be easily eluted from the precipitated silica particles. The heating may be carried out for periods of up to about 10 hours, preferably about 7 hours, but generally heating is stopped after 10 hours since no beneficial results are produced by such prolonged heating. Any temperature above 150° C. may be utilized to permanently affix the polysiloxane oil onto the silica particles. Generally temperatures above 350° C. will flash off many of the lower boiling polysiloxane oils. Hence it is seldom necessary or advantageous to utilize temperatures above 350° C.

The polysiloxane oil that can be permanently affixed to the siliceous amino amide particles so as to render the siliceous amino amide hydrophobic, may be any alkyl, alicyclic, aryl, or aralkyl siloxane or polysiloxane having a viscosity of from about 10 centistokes to about 3000 centistokes at 25°C. Generally the alkyl polysiloxanes are preferred which have viscosities of from 40 centistokes to 1000 centistokes at 25° C. Typical polysiloxanes which may be utilized to render the particles of the siliceous amino amide compositions relatively hydrophobic include dimethyl polysiloxane, diethyl polysiloxane, dipropyl polysiloxane, methyl ethyl polysiloxane, dioctyl polysiloxane, dihexyl polysiloxane, methyl propyl polysiloxane, dibutyl siloxane, didodecyl polysiloxane, etc. (all having viscosities of from about 10 to 3000 centistokes at 25° C.). The amount of the polysiloxane oil which is used to treat the siliceous amino amide composition for a period of at least twenty minutes to render the siliceous composition hydrophobic, may vary from at least 0.5% by weight to about 50% by weight based on the weight of the siliceous amino amide composition. However, amounts from about 0.5% to about 20% by weight based on the weight of the siliceous amino amide composition and treating times of from about twenty minutes to about 7 hours are usually satisfactory and are generally preferred.

The relatively hydrophilic siliceous amino amide compositions can also be rendered hydrophobic by treatment with organo-silicon halides or mixtures of organo-silicon halides. Examples of organo-silicon halides suitable for this purpose are given in U.S. 2,306,222 and U.S. 2,412,470 and include alkyl, aryl, alicyclic and/or aralkyl silicon halides. The organo-silicon halides which may be used to render the hydrophilic siliceous amino amide composition hydrophobic include organic halosilanes such as dimethyl dichloro silane, diphenyl dichloro silane, diethyl dichloro silane, dimethyl dibromo chloro silane, phenyl methyl di chloro silane, etc. The treatment of the relatively hyprophilic siliceous amino amide compositions with the organo-silicon halides can generally be carried out by agitating the finely divided siliceous amino amide compositions in a closed container in the presence of vapors of the organo-silicon halide so that the vapors of the organo-silicon halide will be permanently fixed onto the relatively hydrophilic siliceous amino amide compositions. The resulting silica particles will be rendered relatively hydrophobic since the organo-silicon halide is converted to the corresponding organic polysiloxane due to the presence of moisture in the precipitated siliceous amino amide composition. In carrying out this treating step, the amount of organo-silicon halide and the length of treatment will vary depending upon the surface area of the siliceous compositions and the nature of the organo-silicon halide employed. In carrying out this procedure, the siliceous amino amide composition is treated with from about 0.5% to 50% by weight based upon the weight of the siliceous amino amide composition of the organo-silicon halide for a period of at least 20 minutes. Generally it is preferred to use from about 0.5% to 20% by weight based upon the weight of the siliceous amino amide, of the organo-silicon halide and a treating time of from about one-half hour to about 3 hours.

In order for hydrophobic siliceous amino amide particles to be introduced into an aqueous system to defoam the system, the siliceous amino amide should be dispersed in a liquid hydrocarbon carrier. These liquid hydrocarbons may be any liquid aliphatic, alicyclic, aromatic hydrocarbons or mixtures thereof. The liquid aliphatic, alicyclic or aromatic hydrocarbons suitable for use in the practices of this invention are liquid at room temperature and atmospheric pressure, have a viscosity of about 30 SUS to 400 SUS (Saybolt Universal seconds at 100° F.), a minimum boiling point of at least 150° F. and contain from 6 to 25 carbon atoms. Hydrocarbons such as benzene, hexane, heptane, octane, para octane, mineral seal oil, naphtha, naphthenic mineral oil, paraffinic oil, and mineral oil, etc. are examples of some hydrocarbons which have been found to be suitable for use as the liquid hydrocarbon component in the novel compositions of this invention. If desired, mixtures of any two or more of these or similar hydrocarbons can be employed such as the commercial conventional mixtures. In the practice of this invention the liquid aliphatic, alicyclic or aromatic hydrocarbon component comprises from about 80% to 95% by weight of the novel defoaming compositions.

When the liquid hydrocarbon is added to the hydrophobic siliceous amino amide composition, a gel-like structure results. Generally since the hydrophobic precipitated siliceous amino amide particles are in the form of a conglomerate or gel due to the presence of the organic liquid hydrocarbon, it is sometimes necessary to break this gel by shearing to allow the hydrophobic silica particles to be easily dispersed into the aqueous system which is to be defoamed. The breaking of the gel may be accomplished by homogenization under pressures of from 10 lbs. per square inch to 8000 lbs. per square inch or by ultrasonic mixing. Many other processes such as grinding, may be utilized to destroy the gel-like structure of the hydrophobic particles of siliceous amino amide compositions.

The defoamers of this invention are especially adapted to defoam aqueous systems which contain foam producing solids such as latex, glues, resinous materials, starches, etc. The defoaming compositions are used in amounts of from about 0.01% to about 0.5% by weight of the dry foam producing solids in the aqueous system. Amounts in excess of about 0.5% by weight can be utilized to defoam the aqueous systems but generally such amounts are not practical due to the high cost of the defoamer.

The defoaming compositions of this invention are especially adapted for use in the alkaline pulping process where they produce unexpected and unique defoaming properties. The defoaming compositions of this invention are used in the alkaline pulping process in the following manner. The foaming composition can be introduced into the brown stock washers in the third or fourth stage of the washers which contain the concentrated black liquor. The defoaming compositions are used in amounts of 0.01% to about 0.5% by weight based on the weight of the dry solids present in the concentrated or dilute black liquors system. Thus, by utilizing our defoaming compositions, foaming of black liquor in the brown stock washers is controlled. Moreover, because some of the defoamer is carried through during the pulping process, control of foaming in other stages of the process is accomplished such as the screening process whereas stated before foaming is severe.

The defoamer of this invention may be utilized in defoaming the dilute black liquor. In this case, the foaming composition of this invention can be added to the pulp in the screen room in the same approximate amounts as that utilized for defoaming the concentrated black liquor. Thus by utilizing our defoaming compositions, foaming of the dilute black liquor in the screening and subsequent paper making operations where foaming is severe, is practically eliminated.

The defoaming compositions prepared in the foregoing examples were evaluated by testing their ability to defoam concentrated black liquor obtained from a paper mill having about 16% by weight of solids. The apparatus used in evaluating the foaming composition is described as follows. A beaker of 1000 cc. capacity (tall form) is used. A curved outlet fused onto the base of the beaker is connected with a rubber hose to a centrifugal pump. The pump is used to continuously cycle the concentrated black liquor from the beaker to the pump and back into the beaker. The pumping is carried out at a rate so that the black liquor in the beaker is agitated by the reentering liquid to such an extent that the formation of foam appears. In practice, the rate is approximately two gallons per minute. The concentrated black liquor enters the beaker at a point about 2¼ inches above the surface of the liquid in the beaker and strikes the surface of the liquid in the beaker at an angle of 90°.

In carrying out the testing of the defoamer compositions, 500 cc. of concentrated black liquor at 180° F. which contained about 16% by weight of solids was placed in the beaker of the apparatus. This liquid, when quiescent and at temperature of 180° F., filled the beaker to a level of about 3¼ inches from the bottom. This level was the 0 (zero) point. Then, 0.2 cc. of the defoaming composition to be tested was added to the beaker containing 500 cc. of the aforesaid concentrated black liquor. The concentrated black liquor was warmed to maintain the temperature at 180° F. and was at this temperature during the operation of the test. In operation, the pump and stop watch were started simultaneously. The time in seconds for the foam to form and to rise to the one-inch level above the zero point was recorded. This time is an indication of the defoaming ability of the defoamer which is being tested. The longer the time required for the foam to form and to rise to the indicated mark, the better is the defoaming action of the defoamer.

EXAMPLE I

This example is directed to the production of the siliceous amino amide composition which is utilized in Examples II through XI.

(A) Preparation of the silica sol 3.0 lbs. of isophthalic acid was dissolved in a solution containing 240 lbs. of water and 14 lbs. 6 oz. of a 40° Bé. sodium silicate (NaO:3.22SiO) (a stoichiometric excess of sodium silicate over the amount required to react with all the acid). The resultant sodium isophthalate solution containing silica particles was diluted by the addition of 170 lbs. of water thereto. The solution was then agitated to a temperature of 80° C. and diluted with 220 lbs. of water.

A magnesium sulfate solution containing 2 lbs. 14 oz. of magnesium sulfate ($MgSO_4 \cdot 7H_2O$) dissolved in 15 lbs. of water was slowly added to the solution containing the sodium isophthalate. A cloudy slurry formed due to the build-up of silica particles. The slurry was allowed to cool to 50° C. whereupon 1.5 lbs. of sodium fluosilicate was dissolved therein. The slurry was then cooled to 40° C.

A diluted sulfuric acid solution, prepared by adding 9 lbs. 2 oz. of an aqueous solution containing 96% by weight of sulfuric acid to 52 lbs. of water, was added to the cloudy slurry until the slurry gave an acid reaction to Congo red paper which indicated that the excess sodium silicate had been converted to silica. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and convert the water-soluble salt of the aromatic acid to the water insoluble aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated to 55° C. while agitating. The cloudy slurry after being made acid was digested by allowing it to stand without agitation for 1½ hours at 40° C. After this period the slurry was then treated by heating to a temperaure of about 60° C. This temperature was maintained for one-half hour.

(B) Preparation of the partial amide salt 3 lbs. of the monoamide of halogenated tallow fatty acids and aminoethylethanolamine was dissolved in 60 lbs. of Varnish Makers and Painters Naphtha at a temperature of from 80° C. to 85° C. To this clear solution was then added 283 grams of glacial acetic acid thus forming a clear solution of the monoamide acetate.

(C) Preparation of the siliceous amino amide composition

The partial amide solution prepared above in part B and a sodium silicate dilution prepared by diluting 36 lbs. 9 oz. of a 40° Bé. sodium silicate ($Na_2O:3.22SiO_2$) solution with 40 lbs. of water, were slowly added at the same time to the slurry of the silica sol containing the water insoluble isophthalic acid of part A at a temperature of 60° C. When the partial amide salt solution and the sodium silicate dilution were added to the silica sol, the water insoluble sodium salt of isophthalic acid was converted to the water-soluble sodium salt of isophthalic acid which dissolved and the siliceous amino compound was formed. During this addition, the silica sol was agitated and care was taken to keep the partial amide salt solution in excess at all times to minimize the gel formation. The temperature of the slurry was maintained during the addition at about 60° C. The filtrate from the filtered sample of the slurry had a pH of 7.5. The slurry was digested by allowing it to stand for sixty-seven hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% by weight aqueous solution of sulfuric acid to this filtrate, a slight white haze developed indicating that practically all of the water-soluble isophthalate salt had been converted to the substantially insoluble isophthalic acid.

(D) Recovery of the siliceous amino composition

The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Metals Disintegrating Company Micro-Pulverizer through a ⅟₁₅″ screen. A yield of 28 lbs. of a finely ground material having a particle size of about 20 to 15 microns was obtained. The particles size was determined by means of a microscope with a micron grid.

Examples II to XI are directed to producing the defoamer of this invention utilizing the siliceous amino amide composition prepared in Example I and dimethyl polysiloxane. All parts which are given in the following examples are parts by weight.

EXAMPLE II

The siliceous amino amide composition prepared according to Example I was jet milled in order to produce an aggregate particle diameter of about 0.25 micron and an average surface area of about 220–240 square meters per gram. 1.6 parts of liquid dimethyl polysiloxane (Silicone L45) having a viscosity of 50 centistokes at 25° C. were sprayed onto 8.9 parts of the jet milled siliceous amino amide composition while being rapidly agitated. After all of the dimethyl polysiloxane was sprayed onto the siliceous amino amide composition, mixing was continued for a period of 30 minutes until the formation of a dry homogeneous powder which indicated that all of the liquid polysiloxane had been adsorbed on the powdered siliceous amino amide composition. This dry powder was then heated for a period of one hour at 240° C. so as to permanently affix the liquid polysiloxane onto the powdered siliceous amino amide composition. After heating, the powder was cooled to room temperature and dispersed by agitation in 89.5 parts of white mineral oil (Esso-Bayol 85, mineral oil containing paraffinic hydrocarbons and some naphthenic hydrocarbons, having a viscosity of 84 SUS at 100° F., and a specific gravity of 0.85 at 60° F.) so as to form a gel-like dispersion. This gel-like dispersion was then passed once through a hand homogenizer so as to break up the gel structure and form a uniform dispersion. The uniform dispersion was a flowable liquid.

EXAMPLE III

The siliceous amino amide composition prepared according to Example I was jet milled in order to produce an average aggregate particle diameter of about 0.25 micron and an average surface area of about 220–240 square meters per gram. 2.3 parts of liquid dimethyl polysiloxane (Silicone L45) having a viscosity of 50 centistokes at 25° C. were mixed by rapid agitation with 12.7 parts of the jet milled siliceous amino amide. After all of the dimethyl polysiloxane was added, mixing was continued for a period of about 30 minutes until the formation of a dry powder. This dry powder was then heated for a period of one hour at 275° C. to permanently affix the liquid polysiloxane on the powdered siliceous amino amide composition. After heating was stopped, the powder was cooled to room temperature and dispersed by agitation in 85.0 parts of white mineral oil (Esso-Bayol 85) so as to form a gel-like dispersion. This gel-like dispersion was then passed twice through a hand homogenizer to break up the gel structure and form a uniform dispersion. The uniform dispersion was a flowable liquid.

EXAMPLE IV

The siliceous amino amide composition prepared according to Example I was jet milled in order to produce an average particle size of about 0.25 micron and an average surface area of about 220–240 square meters per gram. 1.9 parts of dimethyl polysiloxane liquid (Silicone L45) having a viscosity of 50 centistokes at 25° C. were mixed by rapid agitation with 10.9 parts of the jet milled siliceous amino amide. After all of the dimethyl polysiloxane was added, mixing was continued for a period of 30 minutes until the formation of a dry powder which indicated that all of the liquid polysiloxane had been adsorbed on the powdered siliceous amino amide composition. This dry powder was then ball milled for 30 minutes and then heated for a period of one hour at 275° C. to permanently affix the siloxane liquid on the particles of the siliceous amino amide composition. After heating was stopped, the powder was cooled to room temperature and dispersed by agitation in 87.2 parts of white mineral oil (Esso-Bayol 85) so as to form a gel-like dispersion. This gel-like dispersion was then passed once through a hand homogenizer so as to break the gel-like dispersion and form a uniform dispersion. The uniform dispersion was a flowable liquid.

EXAMPLE V

The siliceous amino amide composition prepared according to Example I was jet milled in order to produce an average aggregate particle diameter of about 0.25 micron and an average surface area of about 220–240 square meters per gram. 2.2 parts of dimethyl polysiloxane liquid (Silicone L45) having a viscosity of 50 centistokes at 25° C. were mixed by means of an osterizer with 8.3 parts of the jet milled siliceous amino amide. After all of the dimethyl polysiloxane was added, mixing was continued for a period of 30 minutes until the formation of a dry homogeneous powder which indicated that all of the liquid polysiloxane had been adsorbed on the powdered siliceous amino amide composition. This dry powder was then heated for a period of one hour at 245° C. to permanently affix the liquid polysiloxane on the powdered siliceous amino amide composition. After heating was stopped, the powder was cooled to room temperature and dispersed by agitation in 89.5 parts of a white mineral oil (Esso-Bayol 85) so as to form a gel-like dispersion. This gel-like dispersion was then passed once through a hand homogenizer to break up the gel-like particles and from a uniform dispersion. The uniform dispersion was a flowable liquid.

EXAMPLE VI

The siliceous amino amide composition prepared according to Example I was jet milled in order to produce an average aggregate particle diameter of about 0.25 micron and an average surface area of about 220–240 square meters per gram. 1.6 parts of dimethyl polysiloxane liquid (Silicone L45) having a viscosity of 1000 centistokes at 25° C. were mixed by means of an osterizer with 8.9 parts of the jet milled siliceous amino amide. After all of the dimethyl polysiloxane was added, mixing was continued for a period of 30 minutes until the formation of a dry homogeneous powder which indicated that all of the liquid polysiloxane had been adsorbed on the powdered siliceous amino amide composition. This dry powder was then heated for a period of one hour at 180° C. to permanently affix the liquid polysiloxane onto the particles of the siliceous composition. After heating was stopped, the powder was cooled to room temperature and dispersed by agitation in 89.5 parts of white mineral oil (Esso-Bayol 85) so as to form a gel-like dispersion. This gel-like dispersion was then passed through a hand homogenizer to break up the gel-like particles and form a uniform dispersion. The uniform dispersion was a flowable liquid.

EXAMPLE VII

The siliceous amino amide composition prepared according to Example I was jet milled in order to produce an average aggregate particle diameter of about 0.25 micron and an average surface area of about 220–240 square meters per gram. 1.6 parts of liquid dimethyl polysiloxane (Silicone L45) having a viscosity of 50 centistokes at 25° C. was added dropwise to 8.9 parts of the jet milled siliceous amino amide composition. After all of the dimethyl polysiloxane was added, mixing was continued for a period of about one-half hour until the formation of a dry powder which indicated that all of the liquid polysiloxane had been absorbed on the powdered siliceous amino amide composition. This dry powder was then heated for a period of about three hours at about 185° C. to permanently affix the liquid polysiloxane onto the particles of the siliceous amino amide composition. After heating was stopped, the powder was cooled to room temperature and dispersed by agitation in 89.5 parts of mineral seal oil (Gulf 895, a mixture of naphthenic, paraffinic and aromatic hydrocarbons having a viscosity of 45 SUS at 100° F. and a specific gravity of 0.823 at 60° F.) to form a gel-like dispersion. This gel-like dispersion was then hand homogenized to break up the gel-like particles and form a uniform dispersion. The uniform dispersion was a flowable liquid.

EXAMPLE VIII

The siliceous amino amide composition prepared according to Example I was jet milled for about 20 minutes at a temperature of 185° C. which produced a product having an average aggregate particle diameter of about 0.25 micron and an average surface area of about 0.25 micron. 1.6 parts of dimethyl polysiloxane liquid (Silicone L45) having a viscosity of 50 centistokes at 25° C. was mixed at a temperature of 185° C. by rapid agitation with 8.9 parts of the jet milled siliceous amino amide composition. After all of the dimethyl polysiloxane was added, mixing was continued for a period of about 20 minutes at 250° C. by stirring until the formation of a dry homogeneous powder which indicated that all of the liquid polysiloxane had been adsorbed and permanently affixed on the powdered siliceous amino amide composition. After heating was stopped, the powder was cooled to room temperature. This powder was dispersed into 89.5 parts of Gulf Solar Light Heating Oil (a kerosene fuel oil having a boiling point of 520° F. and a specific gravity of 0.820 at 60° F.) to form a gel-like dispersion. This gel-like dispersion was then hand homogenized twice to break up the gel-like structure and to form a uniform dispersion. This uniform dispersion was a flowable liquid.

EXAMPLE IX 1.5 parts of dimethyl polysiloxane liquid (Silicone L45) having a viscosity of 50 centistokes at 25° C. was mixed, by rapid agitation with 8.5 parts of the siliceous amino amide produced in accordance with Example I. After all of the dimethyl polysiloxane was added, mixing was continued for a period of about 30 minutes until the formation of dry solid particles which indicated that all of the liquid polysiloxane had been adsorbed on the powdered siliceous amino amide composition. The dry solid particles were then passed through a hammer mill to break the particles up into a powder. This powder was then jet milled to an average aggregate particle diameter of 0.25 micron and heated for a period of 3½ hours at 185° C. After heating was stopped, the powder was cooled to room temperature. 10.5 parts of this mixture was dispersed into 90.0 parts of white mineral oil (Esso-Bayol 85) to form a gel-like dispersion, which was hand homogenized twice to break up the gel-like structure to form a uniform dispersion. This uniform dispersion was a flowable liquid.

EXAMPLE X

This example is directed to producing a defoamer utilizing a siliceous amino amide composition which has not been hand homogenized to break up the gel-like structure.

The siliceous amino amide composition prepared according to Example I was jet-milled in order to produce an average aggregate particle diameter of about 0.25 micron and an average surface area of about 220–240 square meters per gram. 1.6 parts of liquid dimethyl polysiloxane (Silicone L45) having a viscosity of 50 centistokes at 25° C. was mixed by rapid agitation with 8.9 parts of the jet-milled siliceous amino amide composition. After all of the liquid dimethyl polysiloxane was added, mixing was continued for a period of about a half-hour until the formation of a dry powder which indicated that all of the liquid polysiloxane had been adsorbed on the siliceous amino amide composition. This dry powder was then heated for a period of about 7 hours under constant agitation to permanently affix the siloxane liquid on the particles of the siliceous amino amide composition. After this period, 89.5 parts of white mineral oil (Esso-Bayol 85) was added to the powdered siliceous amino amide composition forming a gel-like dispersion. This gel-like dispersion was then cooled to room temperature.

EXAMPLE XI

A gel-like dispersion containing white mineral oil having dispersed therein a siliceous amino amide composition having liquid dimethyl polysiloxane permanently fixed thereon was prepared in the exact manner of Example X. The gel-like structure was then passed through a homogenizer operating at 8,000 lbs. per square inch to break up the gel-like particles and form a uniform dispersion. This uniform dispersion was a flowable liquid.

EXAMPLE XII

The defoaming compositions of Examples II to XI were tested for their ability to defoam portions of concentrated black liquor containing about 16% by weight of solids in the manner hereinbefore described by determining the time required for the black liquor to reach the one-inch level mark. Also tested in this manner was a portion of concentrated black liquor containing no defoamer. This test sample was designated as the blank. Also a standard defoamer was tested in the manner heretofore described. The results of the tests are recorded in Table I below. All of these tests were carried out utilizing portions of the same batch of concentrated black liquor.

TABLE I.—RESULTS OF THE DEFOAMING TESTS CARRIED OUT ON THE COMPOSITIONS OF THE PRECEDING EXAMPLES.

| Composition of example No.: | Time for foam to rise to one-inch level above the zero point (seconds) |
|---|---|
| II | 60 |
| III | 36 |
| IV | 40 |
| V | 39 |
| VI | 28 |
| VII | 41 |
| VIII | 45 |
| IX | 52 |
| X | 45 |
| XI | 75 |
| Blank | 2 |
| Kerosene | 4 |

The foregoing results demonstrate that the defoamers of this invention markedly reduce the foam which is produced in black liquor as shown by a comparison of the results of the defoaming data using Examples II to XI with that of the blank. Further, the foregoing results clearly show that the defoamers of this invention are vastly superior to a conventional defoamer such as kerosene, since the defoamers of this invention are in most cases at least ten times as effective as kerosene in reducing foam in black liquor. This is clearly shown by a comparison of the defoaming data using Examples II to XI with that of kerosene.

The improved defoaming results achieved by breaking up the gel-like dispersion into a uniform dispersion by homogenization is shown by comparing the defoaming results of Examples X and XI.

Examples XIII to XV are directed to preparing different siliceous amino compounds which are utilized in Examples XVIII, XXI and XXIII.

EXAMPLE XIII (A) *Preparation of the silica sol*

A solution consisting of 45 grams of a 96% by weight sulfuric acid dissolved in 250 milliliters of water was poured as rapidly as possible and with agitation into a sodium silicate solution containing 290 grams of sodium silicate (40° Bé. solution of $Na_2O:3.22SiO_2$) which had been diluted with 290 cc. of water. A heavy silica sol was formed which was then broken up and dispersed into 2,500 ml. of water by mixing for one-half hour. The heavy silica sol gel which formed was broken up and dispersed into 2500 cc. of water by agitation. Agitation was continued for approximately one-half hour. During this time the sol was at all times acid to Congo red paper. After the sol was broken up agitation was continued for an additional half-hour at 30 to 35° C. The silica sol was digested at room temperature for 21 hours and finally heated with agitation at 80° to 85° C.

(B) *Preparation of the partial amide salt*

12.5 grams of the monoamide of Neo-Fat 8 (90% by weight pure caprylic acid) and 12.5 grams of aminoethanolamine were dissolved in 62.5 grams of naphthenic base oil (said oil having a viscosity of 320 Saybolt Universal seconds at about 75° C.). After all of the oil had been added, 3.3 grams of glacial acetic acid were added. The resulting salt was emusified with 150 ml. of water at 85° to 90° C.

(C) *Preparation of the siliceous amino amide composition*

The emulsion of the partial amide salts plus a solution of 112.5 grams of sodium silicate (40° Bé. solution of $Na_2O:3.22SiO_2$) dissolved in 112.5 ml. of water were added simultaneously in a dropwise manner to the previously prepared silica sol. The addition was made in a manner so that the partial amide salt was always in excess. The pH of the resulting creamy white slurry was adjusted to 7.6 by the addition of sulfuric acid (96% by weight) and 70 ml. of water. The adjusted slurry was agitated for one-half hour at 85° to 90° C. and digested at room temperature for 21 hours. The digested slurry was then heated with agitation to 80° to 85° C. and was then filtered. The filter cake was washed four times, each time by slurrying for twenty minutes with 1000 ml. of water, heated to 75° C. and was then filtered. The filtration rate was very rapid, i.e., less than one-half a minute for each 1000 ml. of filtrate. The slurry was filtered through an 8 inch Buchner filter, utilizing about 25 to 28 inches of vacuum. The filter cake was tray-dried at a temperature of 100° to 155° F. to a moisture content of 0.2% by weight. The oily siliceous amino compound powdered during drying and ground very easily. It contained 6.7% by weight of partial amide, 60% by weight of silica (including free silica plus 33% by weight of the oil).

EXAMPLE XIV (A) *Preparation of the silica sol*

A solution of 45 grams of (96% by weight) sulfuric acid dissolved in 250 milliliters of water was poured as rapidly as possible and with agitation into a sodium silicate solution containing 290 grams of sodium silicate (40°

Bé. solution of $Na_2O:3.22SiO_2$) which had been diluted with 290 cc. of water. A heavy silica sol was formed which was then broken up and dispersed into 2,500 ml. of water by mixing for one-half hour. The heavy silica sol gel which formed was broken up and dispersed into 2500 cc. of water by agitation. Agitation was continued for approximately one-half hour. During this time the sol was at all times acid to Congo red paper. After the sol was broken up, agitation was continued for an additional half-hour at 30 to 35° C. The silica sol was digested at room temperature for 21 hours and finally heated with agitation to 80° to 85° C. A solution containing 100 grams of sodium chloride dissolved in 300 cc. of water was then added to the digested silica sol while the sol was heated to a temperature of 85° C. with agitation.

(B) *Preparation of the partial amide salt*

12.5 grams of the diamide of pelargonic acid and diethylenetriamine was melted by heating to 80° to 85° C. After melting was completed, 3.3 grams of glacial acetic acid were added to the molten diamide. The resultant salt was suspended in 176 ml. of water, heated to a temperature of 80° to 85° C.

(C) *Preparation of the siliceous amino amide composition*

The suspension of the partial amide salt and a solution consisting of 112.5 grams of sodium silicate (40° Bé. solution of $Na_2O:3.22SiO_2$) dissolved in 112.5 ml. of water were added to the previously prepared silica sol. This addition was accomplished over a period of twenty minutes under agitation at a temperature of 85° to 95° C. The pH of the resulting slurry was adjusted to 7.4 by the addition of 4.5 ml. of sulfuric acid (96% by weight). After the pH was adjusted, 55 grams of naphthenic base oil (said oil having a viscosity of 320 Saybolt Universal seconds) were added to the slurry. The resulting mixture was agitated for one hour at 85° C. to 90° C. After this period the slurry was cooled to 35° C. and digested at this temperature for thirty-two hours. The digested slurry was then heated to 70° to 75° C. and filtered. The filter cake was washed four times, each time by slurrying for about twenty minutes with 1000 ml. of water heated at 70° to 75° C. and then filtering. The filtrate rate was very rapid, i.e., less than one-half a minute for each 1000 ml. of filtrate. The slurry was filtered through a one-inch diameter Buchner filter under 25 to 28 inches of vacuum. The washed filter cake was tray-dried at 150° to 155° F. for twenty-four hours. The resultant filter cake had a moisture content of 0.6% by weight. The oily siliceous amino compound powdered during drying and ground easily. It contained 7% by weight of the diamide, 63% by weight of silica (including free silica plus that combined with the partial amide) and 30% by weight oil.

EXAMPLE XV (A) *Preparation of the silica sol*

202.5 grams of sodium silicate solution (40° Bé. solution of $Na_2O:3.22SiO_2$) diluted with 202 ml. of water and a solution of 47 grams of an aqueous solution containing (96% by weight) sulfuric acid diluted with 190 ml. of water were slowly added to 2,200 ml. of water having dissolved therein 2.5 grams of sodium silico-fluoride, the addition carried out under constant agitation. Care was taken to keep the acid in excess during the addition so that reaction was at all times acid to Congo red paper. A clear silica sol formed. The sol was heated under agitation to 60° C. until a very slight haze developed in the silicon sol due to the build up of silica particles.

(B) *Preparation of the imidazoline acetate salt*

12.5 grams of the imidazoline of Neo-Fat 8 (90% pure caprylic acid) and aminoethyl ethanolamine were heated to a temperature of 45° C. and 3.5 grams of glacial acetic acid were added thereto, thus forming the imidazoline acetate salt. The acetate salt was dispersed in 237 grams of water at a temperature of 70° to 75° C.

(C) *Preparation of the siliceous amino amide composition*

The imidazoline dispersion prepared in part (B) and 200 grams of sodium silicate (40° Bé. solution of $Na_2O:3.22SiO_2$) diluted with 200 ml. of water were added to the silica sol prepared in part (A), with agitation. The sodium silicate solution and the imidazoline salt was added to the silicate solution of part (A) at a temperature of 64° C. over a period of approximately fifteen minutes. Care was taken during the addition to keep the imidazoline acetate salt in excess in order to minimize gel formation. After the addition was completed 187.5 grams of Varnish Makers and Painters Naphtha were added to the slurry under agitation. After these additions, the pH of the slurry was adjusted to a pH of 7.6 by adding 3.6 ml. of 96% by weight sulfuric acid diluted with 60 ml. of water.

(D) *Recovery of the slurry*

After the pH was adjusted, the slurry was heated under agitation to a temperature of 75° C. After heating, the slurry was cooled to room temperature and digested for 17 hours at room temperature. The digested slurry was heated to 75° C. with agitation and was then filtered. The resulting filter cake was washed four times, each time by slurrying, with 1500 ml. of water at 70° to 75° C. and then filtering the slurry. After the last wash, the filter cake was then frozen in a Dry-Ice chest to a hard solid. It was thawed out at a temperature of 60° to 65° C. whereupon it became sufficiently fluid to remove the approximately 10% by weight of additional water. Thereupon the liquid filter cake was filtered, approximately 160 cc. of water was obtained from approximately 1590 grams of filter cake. The filter cake was then dried at a temperature of 150° to 155° F. for twenty-four hours to a moisture content of 0.5%. The dried filter cake was ground producing a powdered siliceous amino composition.

Examples XVI to XXIII are directed to preparing different defoamers utilizing different siliceous amino compounds.

EXAMPLE XVI 1.6 parts of liquid dimethyl polysiloxane (Silicone L45) having a viscosity of 50 centistokes at 25° C. was added dropwise to 11.4 parts of a siliceous amino amide composition prepared according to Example II of U.S. Patent No. 2,967,828 which was jet milled to an average aggregate particle diameter of one micron and an average surface area of about 220–240 square meters per gram. After all of the liquid dimethyl polysiloxane was added, mixing was continued for two minutes by means of a stirrer until the formation of a dry powder which indicated that all of the liquid polysiloxane had been adsorbed on the siliceous amino amide composition. The dry powder was then heated for 16 hours at a temperature of about 170° C. so as to permanently affix the polysiloxane liquid onto the particles of the siliceous amino amide composition. After this period 87.0 parts of mineral oil (Gulf 333, a mixture of predominantly paraffinic hydrocarbons having a viscosity of 108.1 SUS at 100° F. and a specific gravity of 0.870 at 60° F.) was added to the dry particles thereby forming a gel-like dispersion. This gel-like dispersion was then passed three times through a hand homogenizer to break up the gel-like particles and form a uniform dispersion. This uniform dispersion was a flowable liquid.

EXAMPLE XVII

A flowable liquid defoamer in accordance with this invention was prepared by utilizing the same materials, except that the siliceous amino amide composition was not jet milled.

In Examples XVIII to XXIII, flowable liquid defoaming compositions in accordance with this invention containing siliceous amino amide compositions were produced by utilizing the exact procedure of Example XVI.

EXAMPLE XVIII

Materials: Parts by weight
Siliceous amino amide composition prepared according to Example XIII _____ 9.9
Dimethyl polysiloxane (Silicone L45, viscosity of 50 centistokes at 25° C.) _____ 1.6
Mineral oil (Gulf 333) _____ 88.5

EXAMPLE XIX

Materials:
Siliceous amino amide composition prepared according to Example I of S.N. 836,086, Ihde, filed August 26, 1959 _____ 9.9
Dimethyl polysiloxane (Silicone L45, viscosity of 50 centistokes at 25° C.) _____ 1.6
Mineral oil (Gulf 333) _____ 88.5

EXAMPLE XX

Materials:
Siliceous amino amide composition prepared according to Example VIII of S.N. 836,086, Ihde, filed August 26, 1959 _____ 17.8
Dimethyl polysiloxane (Silicone L45, viscosity of 50 centistokes at 25° C.) _____ 1.6
Mineral oil (Gulf 333) _____ 80.6

EXAMPLE XXI

Materials:
Siliceous amino amide composition prepared according to Example XIV _____ 12.7
Dimethyl polysiloxane (Silicone L45, viscosity of 50 centistokes at 25° C.) _____ 1.6
Mineral oil (Gulf 333) _____ 85.7

EXAMPLE XXII

Materials:
Siliceous amino amide composition prepared according to Example XIII of S.N. 836,086, Ihde, filed August 26, 1959 _____ 12.7
Dimethyl polysiloxane (Silicone L45, viscosity of 50 centistokes at 25° C.) _____ 1.6
Mineral oil (Gulf 333) _____ 85.7

EXAMPLE XXIII

Materials:
Siliceous amino amide composition prepared according to Example XV _____ 8.9
Dimethyl polysiloxane (Silicone L45, viscosity of 50 centistokes at 25° C.) _____ 1.6
Mineral oil (Gulf 333) _____ 89.5

EXAMPLE XXIV

The defoaming composition of Examples XVI to XXIII were tested for their ability to defoam portions of concentrated black liquor in the manner hereinbefore described by determining the time required for the concentrated black liquor containing about 16% by weight of solids to reach the one-inch level mark. Also tested in this manner was a portion of concentrated black liquor containing no defoamer. This test sample was designated as the blank. Also kerosene, which is a standard defoamer, was tested in the manner heretofore described. The results of the tests are recorded in Table II below. All of these tests were carried out utilizing portions of the same batch of concentrated black liquor.

TABLE II.—RESULTS OF THE DEFOAMING TESTS CARRIED OUT ON THE COMPOSITIONS OF THE PRECEDING EXAMPLES

| Composition of example No.: | Time for foam to rise to one-inch level (seconds) |
|---|---|
| XVI | 20 |
| XVII | 15 |
| XVIII | 21 |
| XIX | 21 |
| XX | 21 |
| XXI | 21 |
| XXII | 23 |
| XXIII | 23 |
| Blank | 1 |
| Kerosene | 2 |

The foregoing results demonstrate that the defoamers of this invention markedly reduce the foam which is produced in black liquor as shown by a comparison of the results of the defoaming data using Examples XVI to XXIII with that of the blank. Further, the results of Table II clearly show that the defoamers of this invention are vastly superior to a conventional defoamer such as kerosene, since the defoamers of this invention are in most cases at least 10 times as effective as kerosene in reducing foam in concentrated black liquor. This is clearly shown by a comparison of the results of the defoaming data using Examples XVI to XXIII with that of kerosene. The improved defoaming results achieved by jet milling is shown by comparing the superior defoaming action produced by the jet milled sample of Example XVI with that of the non-jet milled sample of Example XVII.

From a comparison of the results of Tables I and II, it can be seen that the time in seconds for the concentrated black liquor to reach the one-inch level varies with the exact batch of concentrated black liquor used in forming the portion to be tested. This is true since each batch of concentrated black liquors contains different foam producing solids.

Having described our invention what we claim as new and desire to secure by Letters Patent is:

1. A defoamer comprising
    (a) from about 5% to 20% by weight of a hydrophobic silica,
    (b) said hydrophobic silica dispersed in from about 80% to 95% by weight of an organic hydrophobic liquid containing from about 6 to about 25 carbon atoms selected from the group consisting of aliphatic hydrocarbons, alicyclic hydrocarbons, aromatic hydrocarbons, and mixtures thereof, said liquid having a boiling point of at least 150° F. and having a viscosity of from about 30 to about 400 Saybolt Universal seconds at 100° F.,
    (c) said hydrophobic silica containing a siliceous amino amide composition comprising from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide, and from about 80% to 95% by weight of said composition of uncombined silica.

2. A defoamer comprising
(a) from about 5% to 20% by weight of a hydrophobic silica,
(b) said hydrophobic silica being dispersed in from about 80% to 95% by weight of a hydrophobic organic liquid containing from about 6 to about 25 carbon atoms selected from the group consisting of aliphatic hydrocarbons, alicyclic hydrocarbons, aromatic hydrocarbons, and mixtures thereof, said liquid having a boiling point of at least 150° F. and having a viscosity of from about 30 to about 400 Saybolt Universal seconds at 100° F.,
(c) said hydrophobic silica containing a siliceous amino amide composition comprising from about 80% to 90% by weight of said composition of uncombined silica and from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammounium silicates sufficient to neutralize all of the acid radicals of said salt of a partial amide,
(d) said siliceous amino amide composition having permanently affixed thereto from about 0.5% to 20% by weight, based upon the weight of said siliceous amino amide composition, of an organic liquid polysiloxane having a viscosity of from 10 to 3,000 centistokes at 25° C.

3. The defoamer of claim 2 wherein the organic liquid polysiloxane is dimethyl polysiloxane.

4. A defoamer comprising
(a) from about 5% to 20% by weight of a hydrophobic silica,
(b) said hydrophobic silica being dispersed in from about 80% to 95% by weight of a hydrophobic organic liquid containing from about 6 to about 25 carbon atoms, having a boiling point of about at least 150° F. and having a viscosity of from 30 to 400 Saybolt Universal seconds at 100° F.,
(c) said hydrophobic silica comprising from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide,
(d) and from about 80% to 95% by weight of said composition of uncombined silica,
(e) said siliceous amino composition having permanently affixed thereto from about 0.5% to 20% by weight, based upon the weight of said siliceous amino amide composition, of an organic hydrophobic polysiloxane liquid having a viscosity of from about 10 to 3,000 centistokes at 25° C.
(f) said polysiloxane liquid being selected from the group consisting of alkyl polysiloxanes, aryl polysiloxanes, alicyclic polysiloxanes and aralkyl polysiloxanes.

5. A method of preparing a defoamer comprising
(a) providing a powdered siliceous amino amide composition composed of from about 80% to 95% by weight of said composition of uncombined silica and from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide,
(b) mixing said powder with from about 0.5% to 20% by weight of said powdered composition, of organic liquid polysiloxane having a viscosity of from 10 to 3,000 centistokes at 25° C.,
(c) heating said mixture at a temperature of above 150° C. for a period of at least one-half hour so as to permanently affix said polysiloxane liquid on said powdered composition,
(d) dispersing said powdered composition having said liquid siloxane permanently affixed thereto into from about 80% to 95% by weight based upon the weight based upon the weight of the defoamer, of an organic hydrophobic liquid containing from about 6 to about 25 carbon atoms, having a boiling point of at least 150° F., and having a viscosity of from about 30 to about 400 Saybolt Universal seconds at 100° F., said organic hydrophobic liquid being selected from the group consisting of aliphatic hydrocarbons, alicyclic hydrocarbons, aromatic hydrocarbons and mixtures thereof.

6. The method of claim 5 wherein the organic liquid polysiloxane is dimethyl polysiloxane.

7. A method of preparing a defoamer comprising
(a) providing a powdered siliceous amino amide composition composed of from about 80% to 95% by weight of said composition of uncombined silica and from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide,
(b) mixing said powder with from about 0.5% to 20% by weight of said powdered composition, of organic liquid halosilane,
(c) heating said mixture at a temperature of about 150° C. for a period of at least 20 minutes so as to permanently affix said liquid halosilane on said powdered composition, (d) dispersing said powdered composition having said liquid halosilane permanently affixed thereto into from about 80% to 95% by weight based upon the weight of the defoamer, of an organic hydrophobic liquid having a boiling point of at least 150° F., containing from 6 to 25 carbon atoms and having a viscosity of from about 30 to about 400 Saybolt Universal seconds at 100° F., said organic hydrophobic liquid being selected from the group consisting of aliphatic hydrocarbons, alicyclic hydrocarbons, aromatic hydrocarbons and mixtures thereof.

8. In a paper making process, a method of defoaming the pulp and liquid slurry in the screening and washing operations comprising adding to the pulp from about 0.01 to about 0.5% by weight of the dry pulp of a defoamer comprising from about 5% to 20% by weight of a hydrophobic silica dispersed in from about 80% to 95% by weight of an organic hydrophobic liquid selected from the group consisting of aliphatic hydrocarbons, alicyclic hydrocarbons, aromatic hydrocarbons, and mixtures thereof, said liquid having a boiling point of at least 150° F. containing from about 6 to about 25 carbon atoms and having a viscosity of from about 30 to about 400 Saybolt Universal seconds at 100° F., said hydrophobic silica containing a siliceous amino amide composition comprising from about 80% to 95% by weight of said composition of uncombined silica and from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide.

9. In a paper making process, a method of defoaming the pulp and liquid slurry in the screening and washing operations comprising adding to the pulp from about 0.01 to about 0.5% by weight of the dry pulp of a defoamer composition comprising from about 5% to 20% of a hydrophobic silica dispersed in from about 80% to 95% by weight of a hydrophobic organic liquid containing from about 6 to about 25 carbon atoms, said organic liquid being selected from the group consisting of aliphatic hydrocarbons, alicyclic hydrocarbons, aromatic hydrocarbons, and mixtures thereof, said liquid having a boiling point of at least 150° F. and having a viscosity of from about 30 to about 400 Saybolt Universal seconds at 100° F., said hydrophobic silica containing a siliceous amino amide composition comprising from about 80% by weight of composition of uncombined silica and from about 5% to 20% by weight of said composition of a compound produced by reacting (1) a salt of a partial amide, said salt being selected from the group consisting of water-soluble and water-dispersible salts of partial amides, and said partial amide being prepared by reacting an alkylene polyamine with a material selected from the group consisting of aliphatic monocarboxylic acids, their esters and their acyl halides containing the radical RCO—, said R representing a carbon chain length of from about 5 to 21 carbon atoms, glycerides, naphthenic acid and tall oil, with (2) at least an approximately stoichiometrically equivalent quantity of a silicate salt selected from the group consisting of sodium silicates, potassium silicates and ammonium silicates sufficient to neutralize all of the acid radicals of said salt of a partial amide, said siliceous amino amide composition having permanently affixed thereto from about 0.5% to 20% by weight, based upon the weight of said siliceous amino amide composition, of an organic liquid polysiloxane having a viscosity of from 10 to 3,000 centistokes at 25° C.

References Cited by the Examiner
UNITED STATES PATENTS 2,967,828  1/61  Ihde _____ 252—49.7
3,076,768  2/63  Boylan _____ 252—358

DONALL H. SYLVESTER, Primary Examiner.

MORRIS O. WOLK, Examiner.